Nov. 9, 1948.   R. LOZIVIT   2,453,377
THROTTLE CONTROL FOR THE PRIMARY AND
SECONDARY CHARGE OF ENGINES
Filed March 13, 1946
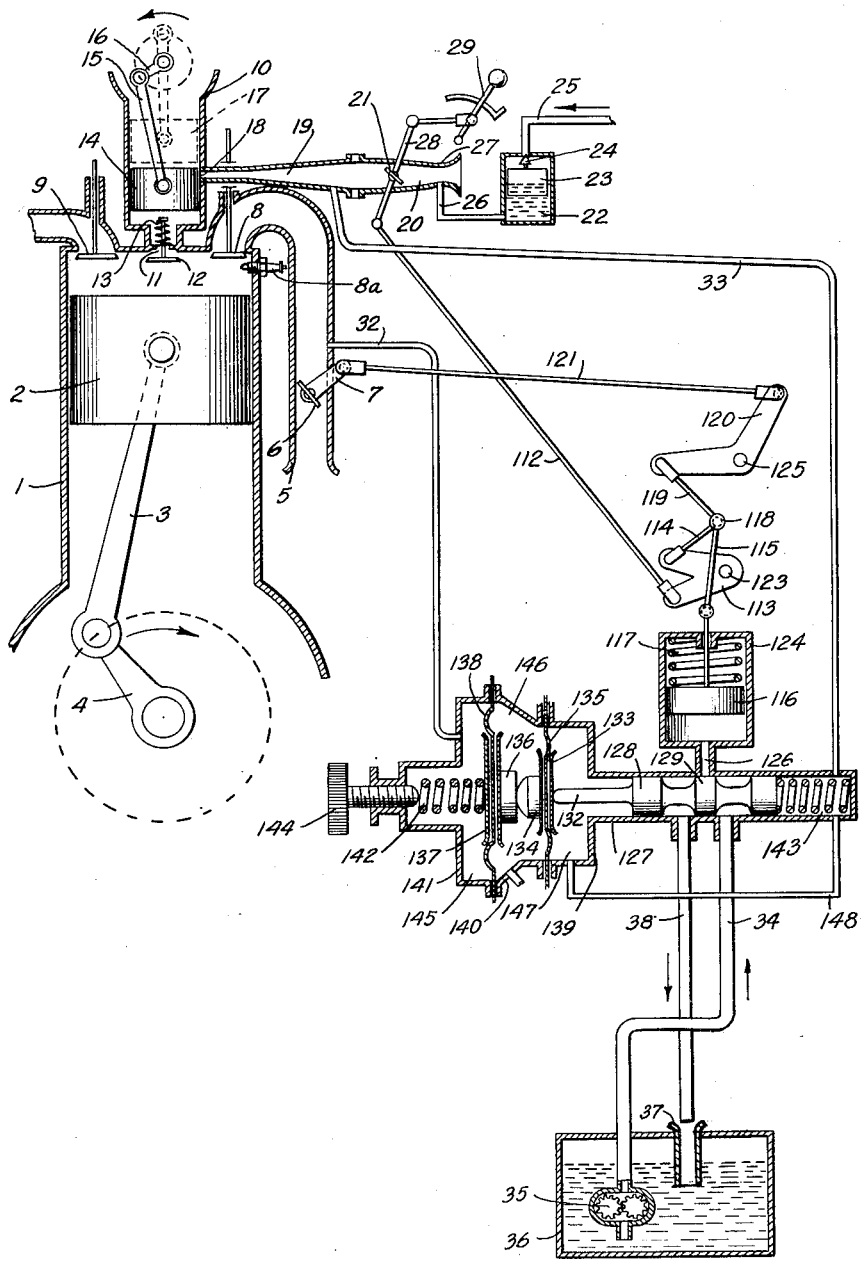
INVENTOR.
RENÉ LOZIVIT
BY *Lee F. Townshend*
ATTORNEY.

Patented Nov. 9, 1948

2,453,377

UNITED STATES PATENT OFFICE 2,453,377

THROTTLE CONTROL FOR THE PRIMARY AND SECONDARY CHARGES OF ENGINES

René Lozivit, Paris, France, assignor to Societe d'Etudes de Carburation pour l'Automobile et l'Aviation "S. E. C. A. A.," Levallois-Perret, France Application March 13, 1946, Serial No. 654,042
In France January 25, 1944

Section 1, Public Law 690, August 8, 1946
Patent expires January 25, 1964

13 Claims. (Cl. 123—75)

1

The present invention relates to internal combustion engines and more especially to internal combustion engines in which the air and fuel mixture to introduce into the cylinders is obtained by adding to the main air stream sucked in by said cylinders through the intake orifices a given weight of a rich fuel and air mixture preliminarily formed in auxiliary cylinders respectively connected with the motor cylinders above mentioned, this introduction of rich mixture into the main air stream being made at a predetermined time of the cycle.

Generally, this preliminary mixture is supplied by carburetters mounted on the intake orifices, respectively, of the auxiliary cylinders. These carburetters include, for instance, in the known way, a float chamber and a jet system ensuring a suitable proportioning of the air that flows through the carburetter and of the fuel that passes through the jet means.

A valve disposed between the auxiliary cylinder and the carburetter permits of adjusting the amount of fuel mixture supplied to said auxiliary cylinder by said carburetter.

Such internal combustion engines have been made for operation on a cycle of the compression ignition type with fuels such for instance as gas-oils. These engines required, for the control thereof, merely means for adjusting the amount of rich mixture supplied to the auxiliary cylinders. The main air stream fed to the motor cylinders remained always the same, whatever be the load and the adjustment.

When it is desired to make use of such engines for operation on the spark ignition cycle, with a light fuel forming with air an explosive mixture, it becomes absolutely necessary to provide valve means for adjusting the rate of flow of the main air stream fed to the motor cylinders. In this case, the working of such engines necessitates, for every modification of the speed and the load, a new adjustment of the positions of the main air stream control valve and of the mixture control valve adjoined to each auxiliary cylinder.

These operations greatly complicate the control of these engines and involve serious risks of incidents dangerous for their mechanical parts.

Experiments conducted on an internal combustion engine of the type above referred to have shown that the fuel mixture that ensures the highest efficiency of the engine for various speeds and loads is obtained when the pressure drop on the downstream side of the carburetter valve is kept always in the same ratio to the pressure

2 drop on the downstream side of the main air stream control valve.

In my U. S. application Serial No. 654,043, filed March 13, 1946, for "Devices for controlling flow rate of fluids through two distinct circuits," now abandoned, there is described an automatic device in which, interconnecting means being provided between the valves that serve to control the fluid flow rates in two distinct conduits, these interconnecting means are subjected to the action of a part differentially operated by the respective pressure differences existing on the one hand across the valve means of the first conduit, and, on the other hand, across the valve means of the second conduit, in such manner that these valve means are automatically adjusted in positions for which the ratio of the pressure drops across the valve means in question is kept constant.

The object of the present invention is to provide improvements in the feed of internal combustion engines of the type above referred to and working with light fuels.

According to an essential feature of the present invention, the device above referred to, as described in my copending U. S. application above mentioned, is combined with such an internal combustion engine. In other words, in an engine of this type made according to the present invention, interconnecting means are provided between the carburetter control valve and the main air stream control valve and these control means are subjected to the action of a part differentially operated by the pressure differences existing respectively, on the one hand, across the carburetter control valve and, on the other hand, across the main stream control valve, whereby these control valves are automatically placed in positions such that the ratio of the pressure drops across these control valves is kept constant.

Other features of the present invention will result from the following detailed description of some specific embodiments thereof.

Preferred embodiments of the present invention will be hereinafter described, with reference to the accompanying drawings, given merely by way of example, and in which the only figure shows, in diagrammatic vertical section, an internal combustion engine of the type in which a preliminary mixture of air and fuel is injected into the main air stream, this engine incorporating the feed device according to the present invention.

The internal combustion engine illustrated by the drawing includes a cylinder 1, a piston 2 movable in said cylinder, and a connecting rod interposed between said piston and a crankshaft 4.

The inside of cylinder 1 can be placed in communication with the atmosphere through a pipe 5 provided with a valve 6 operated through a lever 7. The inlet valve and the exhaust valve of the engine are shown at 8 and 9 respectively. The electric spark plug is shown at 8a.

Above cylinder 1, there is provided a second cylinder 10, adapted to communicate with cylinder 1 through an orifice 11 normally closed by a valve 12 loaded by a spring 13.

In this cylinder 10 is movably mounted a piston 14 actuated, through a connecting rod 15, by a crankshaft 16 rotating at the same speed as the driving shafts of valves 8 and 9. At the end of its suction stroke, piston 14 occupies the position shown at 17 in dotted lines. In this position, said piston opens a port 18 so as to bring the inside of cylinder 10 in communication, through a conduit 19, with a carburetter 20. This carburetter includes a control valve, or throttle valve 21, a chamber 22 for the fuel, provided with a float 23 and a needle valve 24 controlled by said float, said chamber receiving fuel from a pipe 25. The jet means of this carburetter are diagrammatically illustrated as consisting of conduit 26 opening into the neck of venturi 27.

The throttle valve 21 of the carburetter is fitted with a lever 28 connected to a manual control member 29.

The free end of lever 28 and the lever 7 of air valve 6 are respectively connected through suitable rods with levers 113 and 120 pivoted respectively at 123 and 125 and interconnected through links 114 and 119. A connecting rod 115 is interposed between the point of articulation 118 of links 114 and 119 and the end of the rod of a piston 116 slidable in a cylinder 124 and subjected to the action of a spring 117.

Cylinder 124 is in communication through a conduit 126 with a cylindrical casing 127 containing a slide valve 128. According to the position of the portion 129 of this slide valve with respect to the opening of conduit 126, this slide valve connects the inside of cylinder 124 either with a conduit 34 or with a conduit 38. Conduit 34 is connected with a pump 35 immersed in an oil tank 36 and is therefore fed with oil under pressure. Conduit 38 opens into a funnel-shaped inlet conduit 37 opening into said tank 36, so that the liquid discharged from piston 124 can be returned to the oil tank.

The left hand end of slide valve 128 constitutes a push-piece 132 bearing against the central part of a membrane 135 positively connected with a membrane 138. The peripheral edges of said membranes 135 and 138 are tightly held between the corresponding edges of casing elements 139, 140 and 141. Springs 142 and 143, both of the same strength, are arranged to keep the membranes interconnected by parts 134–136. A screw 144 makes it possible to modify the position of the portion 129 of slide valve 128 with respect to conduit 126, for initial adjustment.

Chambers 145, 146 and 147 communicate respectively with pipe 5 through conduit 32, with the atmosphere, and with conduit 19 through conduit 33, connected with the housing of spring 143, itself connected through a pipe 148 with chamber 147, so as to balance the pressures on the respective sides of slide valve 128.

The areas of the active surfaces of membranes 135 and 138 are chosen in such manner that their ratio is equal to the reciprocal of the desired ratio of the pressure drops on the downstream sides of valves 21 and 6, respectively.

The engine according to the present invention will work in the following manner:

When, at the end of its suction stroke, piston 14 is in the position 17 shown in dotted lines, the orifice 18 of conduit 19 places the inside of cylinder 10, where a certain vacuum has been produced, in communication with the atmosphere, through carburetter 20. The stream of air thus caused to flow toward cylinder 10 exerts, at the throat of venturi 27, a suction which causes fuel to flow through jet 26. The air and fuel mixture that is thus produced enters cylinder 10 and, as crankshaft 16 has kept turning during this time, piston 14 leaves its position 17 so as to perform its compression stroke. At the end thereof, the mixture present in cylinder 10 is transferred into cylinder 1 owing to the opening of valve 12.

In the meantime, piston 2 has been moving upwardly toward the end of cylinder 1. Valves 8 and 9 are both closed. A short time before piston 2 reaches the top of its upward stroke, plug 8a gives a spark for ignition of the mixture present in the combustion chamber. The piston is driven downwardly by the explosion that takes place, after which it again moves upwardly for the discharge of the burnt gases. After this upward stroke, piston 2 again moves downwardly so as to draw in the main air stream through valve 8, which has just opened, and conduit 5.

The flow of air through this conduit 5 produces according to the position of air control valve 6, a pressure drop across said valve, and this pressure drop is transmitted, though conduit 32, to the outer side of membrane 138.

In a likewise manner, the pressure drop across the throttle valve 21 of carburetor 20 is transmitted, through conduits 33 and 148 to the outer side of membrane 135.

Since the system is in equilibrium, the ratio of the pressure drops in question is equal to the reciprocal of the ratio of the areas of the active surfaces of the corresponding membranes.

When the position of throttle valve 21 is modified by displacement of control member 29, the pressure drop on the downstream side of said throttle valve is of course modified, and, temporarily, the control device is unbalanced.

Thus for example if this throttle valve 21 has been moved toward closed position, pressure falls in 19, 33, 143, 148 and 147; the system of membranes 135—138 and valve 128 are moved to the right and bring the conduit 126 of cylinder 124 in communication with relief conduit 38. Piston 116 therefore moves down in said cylinder being pushed by spring 117. This displacement of piston 116, operating through links 115, 114, 119 lever 120 link 121 and lever 7, partly closes valve 6. The resulting decrease of the pressure on the down stream side of valve 6 acts through pipe 32 in such manner as to displace diaphragm 138 and slide valve 128 in a direction opposed to that of its initial displacement. Conduit 126 is again closed by portion 129, and piston 116 stops and remains in the new position it occupies. It is clear that, in this position, it has brought valve 6 into a position of opening such that the ratio of the pressure drops across valves 6 and 21 is equal to the reciprocal of the ratio of the areas of the active surfaces of membranes 138 and 135 respectively. As this last mentioned ratio is constant, the desired condition above set forth has been truly complied with. Control of the engine is thus greatly simplified since the driver has but to operate control member 29 and the air valve is automatically brought into the proper position corresponding to the position of said control member.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. In connection with an internal combustion engine, a feed device which comprises, in combination, conduit means for supplying a main air stream to said engine, means for forming a fuel and air mixture, means for injecting said mixture into said main air, valve means in said conduit means for controlling the flow rate of said main air stream therethrough, valve means for controlling the flow rate of said mixture from said mixture forming means to said mixture injecting means, and means differentially operative by the respective pressure drops across said two valve means for controlling at least one of said valve means to keep a constant ratio of said pressure drops.

2. In connection with an internal combustion engine, a feed device which comprises, in combination, conduit means for supplying a main air stream to said engine means for forming a fuel and air mixture, means for injecting said mixture into said main air, valve means in said conduit means for controlling the flow rate of said main air stream therethrough, valve means for controlling the flow rate of said mixture from said mixture forming means to said mixture injecting means, means for manually operating said last mentioned valve means, and means differentially operative by the respective pressure drops across said two valve means for controlling at least said first mentioned valve means to keep a constant ratio of said pressure drops.

3. In connection with an internal combustion engine, a feed device which comprises, in combination, an air conduit for supplying a main air stream to said engine, pumping means for forcing a fuel and air mixture into said engine, means for driving said pumping means in synchronism with said engine, a carburetter for forming a fuel and air mixture, conduit means for connecting the output of said carburetter with said pumping means, a flow rate control valve in said air conduit, a flow rate control valve in said mixture conduit means, control means for directly adjusting the position of said second mentioned control valve, and means differentially operative by the respective pressure drops on the downstream sides of said control valves in said air conduit and mixture conduit means respectively for controlling said first mentioned valve so as automatically to keep the ratio of said respective pressure drops at a constant value.

4. In connection with an internal combustion engine, a feed device which comprises, in combination, an air conduit for supplying a main air stream to said engine, pumping means for forcing a fuel and air mixture into said engine, means for driving said pumping means in synchronism with said engine, a carburetter for forming a fuel and air mixture, conduit means for connecting the output of said carburetter with said pumping means, a flow rate control valve in said air conduit, a flow rate control valve in said mixture conduit means, control means for directly adjusting the position of said second mentioned control valve, adjustable means for interconnecting said control valves, and means differentially operative by the respective pressure drops on the downstream sides of said control valves in said air conduit and mixture conduit means respectively for adjusting said interconnecting means, whereby the ratio of said respective pressure drops is automatically kept at a constant value.

5. In connection with an internal combustion engine, a feed device which comprises, in combination, an air conduit for supplying a main air stream to said engine, pumping means for forcing a fuel and air mixture into said engine, means for driving said pumping means in synchronism with said engine, a carburetter for forming a fuel and air mixture, conduit means for connecting the output of said carburetter with said pumping means, a flow rate control valve in said air conduit, a flow rate control valve in said mixture conduit means, control means for directly adjusting the position of said second mentioned control valve, adjustable means for interconnecting said control valves, servo-control means for adjusting said interconnecting means, and means differentially operative by the respective pressure drops on the downstream sides of said control valves in said air conduit and mixture conduit means respectively for operating said servo-control means, whereby the ratio of said respective pressure drops is automatically kept at a constant value.

6. In connection with an internal combustion engine, a feed device which comprises, in combination, an air conduit for supplying a main air stream to said engine, pumping means for forcing a fuel and air mixture into said engine, means for driving said pumping means in synchronism with said engine, a carburetter for forming a fuel and air mixture, conduit means for connecting the output of said carburetter with said pumping means, a flow rate control valve in said air conduit, a flow rate control valve in said mixture conduit means, control means for directly adjusting the position of said second mentioned control valve, adjustable means for interconnecting said control valves, hydraulic jack means for adjusting said interconnecting means, and means differentially operative by the respective pressure drops on the downstream sides of said control valves in said air conduit and mixture conduit means respectively for operating said jack means, whereby the ratio of said respective pressure drops is automatically kept at a constant value.

7. In connection with an internal combustion engine, a feed device which comprises, in combination, an air conduit for supplying a main air stream to said engine, pumping means for forcing a fuel and air mixture into said engine, means for driving said pumping means in synchronism with said engine, a carburetter for forming a fuel and air mixture, conduit means for connecting the output of said carburetter with said pumping means, a flow rate control valve in said air conduit, a flow rate control valve in said mixture conduit means, control means for directly adjusting the position of said second mentioned control valve, adjustable means for interconnecting said control valves, hydraulic jack means for adjusting said interconnecting means, a source of liquid under pressure, a discharge pipe, distributing valve means for either placing said hydraulic jack means in communication with either said source or said discharge pipe or cutting it off from the outside, and means differentially operative by the respective pressure drops on the downstream sides of said control valves in said air conduit and mixture conduit means respectively for operating said distributing valve means, whereby the ratio of said respective pressure drops is automatically kept at a constant value.

8. In connection with an internal combustion engine, a feed device which comprises, in combination, an air conduit for supplying a main air stream to said engine, pumping means for forcing a fuel and air mixture into said engine, means for driving said pumping means in synchronism with said engine, a carburetter for forming a fuel and air mixture, conduit means for connecting the output of said carburetter with said pumping means, a flow rate control valve in said air conduit, a throttle valve for controlling the flow of fuel and air mixture through said carburetter, control means for directly adjusting the position of said throttle valve, a manometric member operative in response to variations of the air pressure in said conduit on the downstream side of said control valve, another manometric member operative in response to variations of the pressure in said conduit means on the downstream side of the throttle valve, adjustable means for interconnecting said two valves, and means operative by the differentially combined actions of said manometric means for adjusting said interconnecting means, whereby the pressure drops across said valves in said air conduit and said conduit means respectively are automatically kept at a constant ratio of each other.

9. In connection with an internal combustion engine, a feed device which comprises, in combination, an air conduit for supplying a main air stream to said engine, pumping means for forcing a fuel and air mixture into said engine, means for driving said pumping means in synchronism with said engine, a carburetter for forming a fuel and air mixture, conduit means for connecting the output of said carburetter with said pumping means, a flow rate control valve in said air conduit, a throttle valve for controlling the flow of fuel and air mixture through said carburetter, control means for directly adjusting the position of said throttle valve, a manometric member operative in response to variations of the air pressure in said conduit on the downstream side of said control valve, another manometric member operative in response to variations of the pressure in said conduit means on the downstream side of said throttle valve, adjustable means for interconnecting said two valves, servo-control means for adjusting said interconnecting means, and means operative by the differentially combined actions of said manometric members for operating said servo-control means, whereby the pressure drops across said valves in said air conduit and said conduit means respectively are automatically kept at a constant ratio to each other.

10. In connection with an internal combustion engine, a feed device which comprises, in combination, an air conduit for supplying a main air stream to said engine, pumping means for forcing a fuel and air mixture into said engine, means for driving said pumping means in synchronism with said engine, a carburetter for forming a fuel and air mixture, conduit means for connecting the output of said carburetter with said pumping means, a flow rate control valve in said air conduit, a throttle valve for controlling the flow of fuel and air mixture through said carburetter, control means for directly adjusting the position of said throttle valve, a manometric member operative in response to variations of the air pressure in said conduit on the downstream side of said control valve, another manometric member operative in response to variations of the pressure in said conduit means on the downstream side of said throttle valve, adjustable means for interconnecting said two valves, fluid actuated servo-control means for adjusting said interconnecting means, and distributing valve means operative by the differentially combined actions of said manometric members for operating said servo-control means, whereby the pressure drops across said valves in said air conduit and said conduit means respectively are automatically kept at a constant ratio to each other.

11. In connection with an internal combustion engine, a feed device which comprises, in combination, an air conduit for supplying a main air stream to said engine, pumping means for forcing a fuel and air mixture into said engine, means for driving said pumping means in synchronism with said engine, a carburetter for forming a fuel and air mixture, conduit means for connecting the output of said carburetter with said pumping means, a flow rate control valve in said air conduit, a throttle valve for controlling the flow of fuel and air mixture through said carburetter, control means for directly adjusting the position of said throttle valve, a manometric membrane deformable in response to variations of the air pressure in said conduit on the downstream side of said control valve, a manometric membrane deformable, in opposition with the first membrane in response to variations of the pressure in said conduit means on the downstream side of said throttle valve, adjustable means for interconnecting said two valves, servo-control means for adjusting said interconnecting means, and means operative by the combined actions of said manometric membranes for operating said servo-control means, whereby the pressure drops across said valves in said air conduit and said conduit means respectively are automatically kept at a constant ratio to each other.

12. In connection with an internal combustion engine, a feed device which comprises, in combination, an air conduit for supplying a main air stream to said engine, pumping means for forcing a fuel and air mixture into said engine, means for driving said pumping means in synchronism with said engine, a carburetter for forming a fuel and air mixture, conduit means for connecting the output of said carburetter with said pumping means, a flow rate control valve in said air conduit, a throttle valve for controlling the flow of fuel and air mixture through said carburetter, control means for directly adjusting the position of said throttle valve, a manometric member operative in response to variations of the air pressure in said conduit on the downstream side of said control valve, another manometric member operative in response to variations of the pressure in said conduit means on the downstream side of said throttle valve, adjustable means for interconnecting said two valves, hydraulic jack means for adjusting said interconnecting means, and means operative by the differentially combined actions of said manometric means for operating said jack means, whereby the pressure drops across said valves in said air conduit and said conduit means respectively are automatically kept at a constant ratio to each other.

13. In connection with an internal combustion engine, a feed device which comprises, in combination, an air conduit for supplying a main air stream to said engine, pumping means for forcing a fuel and air mixture into said engine, means for driving said pumping means in synchronism with said engine, a carburetter for forming a fuel and air mixture, conduit means for connecting the output of said carburetter with said pumping means, a flow rate control valve in said air conduit, a throttle valve for controlling the flow of fuel and air mixture through said carburetter, control means for directly adjusting the position of said throttle valve, a manometric member operative in response to variations of the air pressure in said conduit on the downstream side of said control valve, another manometric member operative in response to variations of the pressure in said conduit means on the downstream side of said throttle valve, adjustable means for interconnecting said two valves, servo-control means for adjusting said interconnecting means, and adjustable means operative by the differentially combined actions of said manometric means for operating said servo-control means, whereby the pressure drops across said valves in said air conduit and said conduit means respectively are automatically kept at a constant ratio to each other.

RENÉ LOZIVIT.

REFERENCES CITED

The following references are of record in the file of this patent:

UNITED STATES PATENTS

| Number | Name | Date |
|---|---|---|
| 736,224 | Cushman | Aug. 11, 1903 |
| 1,477,363 | Kessler | Dec. 11, 1923 |
| 1,543,717 | Madler | June 30, 1925 |
| 1,589,662 | Ricardo | June 22, 1926 |
| 2,397,835 | Brame | Apr. 2, 1946 |
| 2,398,878 | Bolli | Apr. 23, 1946 |

FOREIGN PATENTS

| Number | Country | Date |
|---|---|---|
| 536,805 | England | 1941 |